United States Patent
Douady et al.

(10) Patent No.: US 7,574,629 B2
(45) Date of Patent: Aug. 11, 2009

(54) METHOD AND DEVICE FOR SWITCHING BETWEEN AGENTS

(75) Inventors: César Douady, Orsay (FR); Philippe Boucard, Le Chesnay (FR)

(73) Assignee: Arteris, Guyancourt Cedex (FR)

( * ) Notice: Subject to any disclaimer, the term of this patent is extended or adjusted under 35 U.S.C. 154(b) by 620 days.

(21) Appl. No.: 11/054,179

(22) Filed: Feb. 9, 2005

(65) Prior Publication Data

US 2005/0210325 A1    Sep. 22, 2005

(30) Foreign Application Priority Data

Mar. 2, 2004   (FR) ................... 04 02149

(51) Int. Cl.
*G06F 11/00* (2006.01)

(52) U.S. Cl. .................. 714/43; 714/748; 370/244

(58) Field of Classification Search ............... 714/43, 714/701, 746, 748; 370/244
See application file for complete search history.

(56) References Cited

U.S. PATENT DOCUMENTS

| | | | |
|---|---|---|---|
| 5,361,267 A * | 11/1994 | Godiwala et al. ........... 714/755 |
| 5,651,002 A | 7/1997 | Van Seters et al. |
| 5,974,028 A * | 10/1999 | Ramakrishnan ............ 370/229 |
| 6,031,818 A * | 2/2000 | Lo et al. .................... 370/216 |
| 6,198,735 B1 * | 3/2001 | Pazhyannur et al. ........ 370/349 |
| 6,400,720 B1 | 6/2002 | Ovadia et al. |
| 2002/0085582 A1 | 7/2002 | Kim |
| 2002/0196785 A1 | 12/2002 | Connor |
| 2004/0017820 A1 | 1/2004 | Garinger et al. |
| 2005/0240829 A1* | 10/2005 | Safford et al. ............... 714/43 |
| 2007/0198897 A1* | 8/2007 | Schroeder .................. 714/776 |
| 2008/0034267 A1* | 2/2008 | Hou et al. .................... 714/752 |

FOREIGN PATENT DOCUMENTS

| | | |
|---|---|---|
| EP | 1061695 | 12/2000 |
| EP | 1182819 | 2/2002 |
| EP | 1206077 | 5/2002 |

OTHER PUBLICATIONS

Guerrier et al., "A Generic Architecture for On-Chip Packet-Switched Interconnections", Mar. 2000, IEEE, pp. 250-254.

(Continued)

*Primary Examiner*—Marc Duncan
(74) *Attorney, Agent, or Firm*—Meyertons, Hood, Kivlin, Kowert & Goetzel, P.C.; Eric B. Meyertons

(57) ABSTRACT

In some embodiments, a system for communication between agents in a point-to-point interconnection system includes at least one initiator agent capable of dispatching at least one message destined for at least one determined receiver agent; at least one intermediate agent capable of forwarding at least one message to at least one determined receiver agent; at least one receiver agent capable of receiving at least one message originating from an initiator agent via at least one intermediate agent; and means of error detection and means of erroneous message marking. In some embodiments, a receiver agent includes means for formulating an error message and means for sending the error message to the initiator agent so as to warn the said initiator agent of the presence of an error.

11 Claims, 2 Drawing Sheets

OTHER PUBLICATIONS

Rosenberg et al., "SIP: Session Initiation Protocol", Feb. 2002, *Internet Engineering Task Force*, 192 pages.

Rapport de Recherche Preliminaire for FR 0308225, Date d'achevement de la recherche Jul. 5, 2004, (1 page).

Rapport de Recherche Preliminaire for FR 0308905, date d'achevement de la recherché Dec. 23, 2003 (1 page).

Tamir et al., "High-performance multi-queue buffers for VLSI communication switches", Computer Architecture, 1988, Conference Proceedings, 15$^{th}$ Annual International Symposium, May 30, 1988-Jun. 2, 1988, pp. 343-354, XP002266011.

Kermani et al., "Virtual Cut-Through: A New Computer Communication Switching Technique", Computer Networks, North Holland, Amsterdam, NL, vol. 3, 1979, pp. 267-286, XP000814463, ISSN: 0376-5075.

http://www.cs.bu.edu/~best/crs/cs551/lectures/lecture-15.html, "Message Passing Architectures", Lesson 15, A. Bestavros, Nov. 1, 1994 (3 pages).

http://www.proj-mission.org/EE660/Gautam7.4.pdf "Message Passing Mechanisms" (3 pages).

Rapport de Recherche Preliminaire for French Application No. FR 0309918 date d'achevement de la recherché Apr. 6, 2004 (3 pages).

Yamaguchi et al. "CODA-R: a reconfigurable testbed for real-time parallel computation", Real-Time Computing Systems and Applications, 1997, Proceedings, Fourth International Workshop on Taipei, Taiwan Oct. 27-29, 1997, Los Alamitos, CA, USA, IEEE Comput. Soc., U.S., Oct. 27, 1997, pp. 252-259, XPO10251835, ISBN: 0-8186-8073-3.

Toda et al., "A priority forwarding scheme for real-time multistage interconnection networks", Proceedings of the Real Time Systems Symposium, Phoenix, Dec. 2-4, 1992, Los Alamitos, IEEE Comp. Soc. Press, U.S. Dec. 2, 1992, pp. 208-217, XP010031283, ISBN: 0-8186-3195-3.

Toda et al., "Implementation of a priority forwarding router chip for real-time interconnection networks", Parallel and Distributed Real-Time Systems, 1994, Proceedings of the Second Workshop on Cancun, Mexico, Apr. 28-29, 1994, Los Alamitos, CA, USA, IEEE Comput. Soc. Apr. 28, 1994, pp. 166-175, XP010125212, ISBN: 0-8186-6420-7.

Rapport de Recherche Preliminaire for FR 0400554, date d'achevement de la recherché Sep. 29, 2004 (3 pages).

Rapport de Recherche Preliminaire for FR 0402149, date d'achevement de la recherché Sep. 22, 2004 (3 pages).

Benini et al., "Networks on Chips: A New SoC Paradigm", Computer, IEEE Computer Society, Long Beach, CA, US, vol. 35, No. 1, Jan. 2002, pp. 70-78, XP001091890, ISSN: 0018-9162.

Liu et al., "Error control schemes for networks: An overview", Mobile Networks and Applications, vol. 2, No. 2, Oct. 1997, pp. 167-182, XP002296032, Kluwer Academic Publishers, Hingham, MA, USA.

Rapport de Recherche Preliminaire for French Application No. FR 0313298 date d'achevement de la recherché Jul. 20, 1994 (2 pages).

U.S. Appl. No. 10/884,794 to Douady et al., entitled "System and Method for Communicating Between Modules", filed Jul. 2, 2004.

U.S. Appl. No. 10/892,815 to Douady et al., entitled "Device and Method for Forwarding a Message", filed Jul. 16, 2004.

U.S. Appl. No. 10/915,950 to Douady et al., entitled "Method and Device for Managing Priority During the Transmission of a Message", filed Aug. 11, 2004.

U.S. Appl. No. 11/039,112 to Douady et al., entitled "Method and System for Transmitting Messages in an Interconnection Network", filed Jan. 19, 2005.

U.S. Appl. No. 10/988,831 to Douady et al., entitled "System and Method for Transmitting a Sequence of Messages in an Interconnection Network", filed Nov. 15, 2004.

* cited by examiner

METHOD AND DEVICE FOR SWITCHING BETWEEN AGENTS

BACKGROUND OF THE INVENTION

1. Field of the Invention

The present invention relates to the field of communication between interconnected modules.

2. Description of the Relevant Art

In the field of computing, conventional systems are centred around a specialized bus which interconnects several agents. Here, "agent" is understood to mean an element able to receive or to dispatch data over a bus, for example a central processing unit, a memory, an input/output device, etc.

According to a specific protocol individual to the bus, only one agent can dispatch a message over the bus simultaneously. The execution of a processing requires that operands be present in the agent that will execute the processing and consequently demand the transfer of data between agents via the communication system. Here, "operand" is understood to mean an element to which an operation pertains.

For example, a system including an arithmetic coprocessor and a memory of SDRAM type which contains data must, in order for it to be possible for an operation to be executed, transfer the operands stored in the memory by way of the controller of the memory, then by way of the bus to the coprocessor. The results of the operation will be transferred over the same bus.

This results in the number of exchanges being limited due to the use of a bus which forms a single and bounded communication resource, the bandwidth of the communication system formed by the bus being finite.

In applications where high performance is necessary, the execution of a programme requires a specific organization of the instructions so as to optimize and best sequence the various exchanges between the agents that are connected to the communication bus, so as to optimize the use of the bandwidth. The compilers may take charge of this type of problem, but in a non-optimal manner and under the proviso that a part of the resources of the system is used for the management of these exchanges. The system thus loses efficiency and the performance degrades all the more quickly the higher the number of agents that are present on the communication bus.

Moreover, it is possible to interconnect two distinct buses, for example of PCI type, by means of a bridge allowing data transfer from one bus to another. Such an architecture is known through the document <http://www.hitachi-ul.co.jp/PROP/IP/epharaohip.html>. A difficulty then arises in the case of an error in transferring data, for example to an address that does not exist in the other bus. Current techniques do not make it possible to manage situations of this kind satisfactorily.

SUMMARY OF THE INVENTION

At least one of the objectives of the present embodiments aims to remedy the drawbacks of the conventional system mentioned above.

It is desirable for several requests to be dispatchable simultaneously between the various agents present and for all the agents to be able to work in parallel and sequentially without it being necessary to have a general sequencer to order the general datastream.

In some embodiments, a system and/or method of point-to-point communication allow dependable communications between various agents while judiciously managing erroneous messages.

The method of communication between agents, according to one embodiment, is destined for an interconnection system including at least three elements, in which:

a message destined for a determined receiver agent is sent by a message initiator agent over a point-to-point interconnection network, an error detection is performed and, if an error is actually detected, the said message is marked as being erroneous, the message is forwarded to the said determined receiver agent if the said forwarding is possible and, if the said message is marked as being erroneous, the receiver agent formulates an error message and sends it to the initiator agent so as to warn the said initiator agent of the presence of an error.

In one embodiment, the error detection is performed by an intermediate agent of the interconnection network. The intermediate agent may be a router, a filter, an interface, etc.

Advantageously, the said message is marked as being erroneous by the setting of at least one bit of the said message.

In one embodiment, the receiver agent detects the marking of the message before responding to the initiator agent.

In one embodiment, the detection of the said marking of the message disables the normal processing of the message by the receiver agent. The normal processing of the message may include the storing of the data contained in the message and the dispatching of an acknowledgement of receipt message, the dispatching of a message containing data present at an address contained in the message processed, etc. Stated otherwise, the normal processing provides the response expected by the initiator agent.

Advantageously, if the message cannot be forwarded to the said determined receiver agent from the said initiator agent, then the message is marked as being erroneous and forwarded to another receiver agent linked to the interconnection network. The other receiver agent may be a determined receiver agent. The other receiver agent can receive all the messages that cannot be forwarded from the said initiator agent. A receiver agent that is generally lightly loaded with tasks in the circuit concerned can be used for this purpose.

In one embodiment, if the said determined receiver agent belongs to a zone of restricted access in which the said message does not have authorization to enter, then the said message is marked as being erroneous and then sent to the said determined receiver agent notwithstanding the access restriction. The receiver agent then detects the marking of the message before responding to the initiator agent, the detection of the said marking of the message disabling the normal processing of the message by the receiver agent. The security of the restricted access zone is thus preserved.

A system for communication between agents in a point-to-point interconnection system, according to an embodiment, includes at least three elements. The system includes at least one initiator agent capable of dispatching at least one message destined for at least one determined receiver agent, at least one intermediate agent capable of forwarding at least one message to at least one determined receiver agent, at least one receiver agent capable of receiving at least one message originating from an initiator agent via at least one intermediate agent, and means of error detection and means of erroneous message marking. The receiver agent includes means for formulating an error message and means for sending the error message to the initiator agent so as to warn the said initiator agent of the presence of an error.

In one embodiment, at least one intermediate agent includes means of error detection and means of erroneous message marking.

In one embodiment, the means of erroneous message marking include a means of setting at least one determined bit of the said message.

In one embodiment, the receiver agent includes means of disabling the formulation of a response to an erroneous message and of formulating an error message destined for the initiator agent. The disabling means may include a detector which performs the reading of the said determined bit and outputs a digital signal sent to an input of an OR gate whose other input or inputs may be linked to the output of other error detection elements, the output of the OR gate being linkable to a disabling input of a processing module of the receiver agent. The means implemented may be simple.

In one embodiment, at least one intermediate agent includes means for forwarding an erroneous marked message to another receiver agent linked to the interconnection network, the said forwarding means being active if the message may not be forwarded to the said determined receiver agent from the said initiator agent.

The system and/or method apply to communication systems integrated onto an electronic chip.

Interconnection networks ensure transmission of messages between various agents or entities of a communication network. A transmission may be made without performing message processing, or while performing message processing. In most cases one speaks of transmission of messages. Processing of a message is understood to mean for example an analysis of data contained in the message, or an appending of data to the message.

A message is, of course, a string of computer data, that is to say a string of bits or bytes. Each message includes a message header which chiefly includes the destination address of the message, the size of the message and the error signalling bit.

Interconnection networks are generally composed of two distinct parts which interact, namely a hardware part including physical links and a network controller, hard-wired or microprogrammed, which executes a low-level protocol, and a software part for effecting the interface with software functions of higher level.

An ideal interconnection network would certainly be a fully interconnected network, that is to say a network in which each pair of agents is connected by a point-to-point link. However, this is unrealistic onwards of a few tens of agents. It is therefore necessary for the interconnection network to be able to cater for all the communications between agents with a limited number of links per agent.

Specialized agents exist for performing routing or switching or transmission of messages flowing over the interconnection network.

These interconnection networks include transmission devices or routers (also known as "switches"), an organization of the network ensuring the link between the routers and the other agents, and a routing assembly which caters for the flow of messages within the organization of the network.

A router is an active agent of the interconnection network which receives as input messages coming from one or more agents and which forwards or routes each of these messages respectively to their destination agent or to another router. This routing is performed by means of the address of the message destination agent, which is present in the header of the message to be routed.

The organization of a network constitutes the physical structure linking the various nodes or points of connections of an interconnection network.

The routing assembly manages the way in which a message is routed, or forwarded, from a source agent dispatching a message to a message destination agent through routers, along a routing path. The message header includes the destination address.

Any agent present in an interconnection network can dispatch and/or receive messages. The routing technique determines the way in which the messages are transmitted from the dispatching agent, which creates the message, to the destination agent. For a given interconnection network, there are various routing techniques, for which the main objectives are to reduce the end of message latency, or end of message forwarding time, for a message, from the dispatching agent to the destination agent, to increase the overall throughput and to improve the overall reliability of the network. The latency includes all the waiting times due to the way in which the messages propagate in the network and more particularly through the devices for transmitting messages in charge of routing the messages. The throughput is the quantity of computer data that a link of the network can transport per unit time, and can be measured locally over a link of the interconnection network or globally over the whole of the interconnection network. The reliability of a network is important, since the probability of errors grows rapidly with the number of nodes in an interconnection network.

A transmission agent includes at least one input including a storage means organized as a message queue of the first in first out or FIFO type and at least one output including a message transmission means able to decide the message to be transmitted. Only the first messages of the queues of the inputs are, of course, visible to the transmission agent.

The system and/or method therefore allow not only an increase in the reliability of a communication system and ensures feedback of information to the dispatcher should a message be unable to reach its destination. The system and/or method applies to asynchronous communication between synchronous agents.

BRIEF DESCRIPTION OF THE DRAWINGS

The invention will be better understood on reading the detailed description of a few embodiments taken by way of wholly non-limiting examples and illustrated by the appended drawings, in which.

Figure 2:
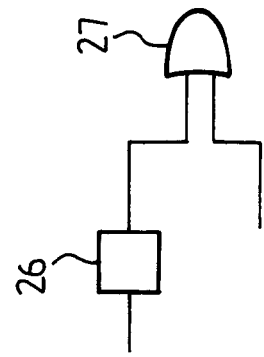
FIG. 2 is a view of a detail of FIG. 1.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

Figure 1:
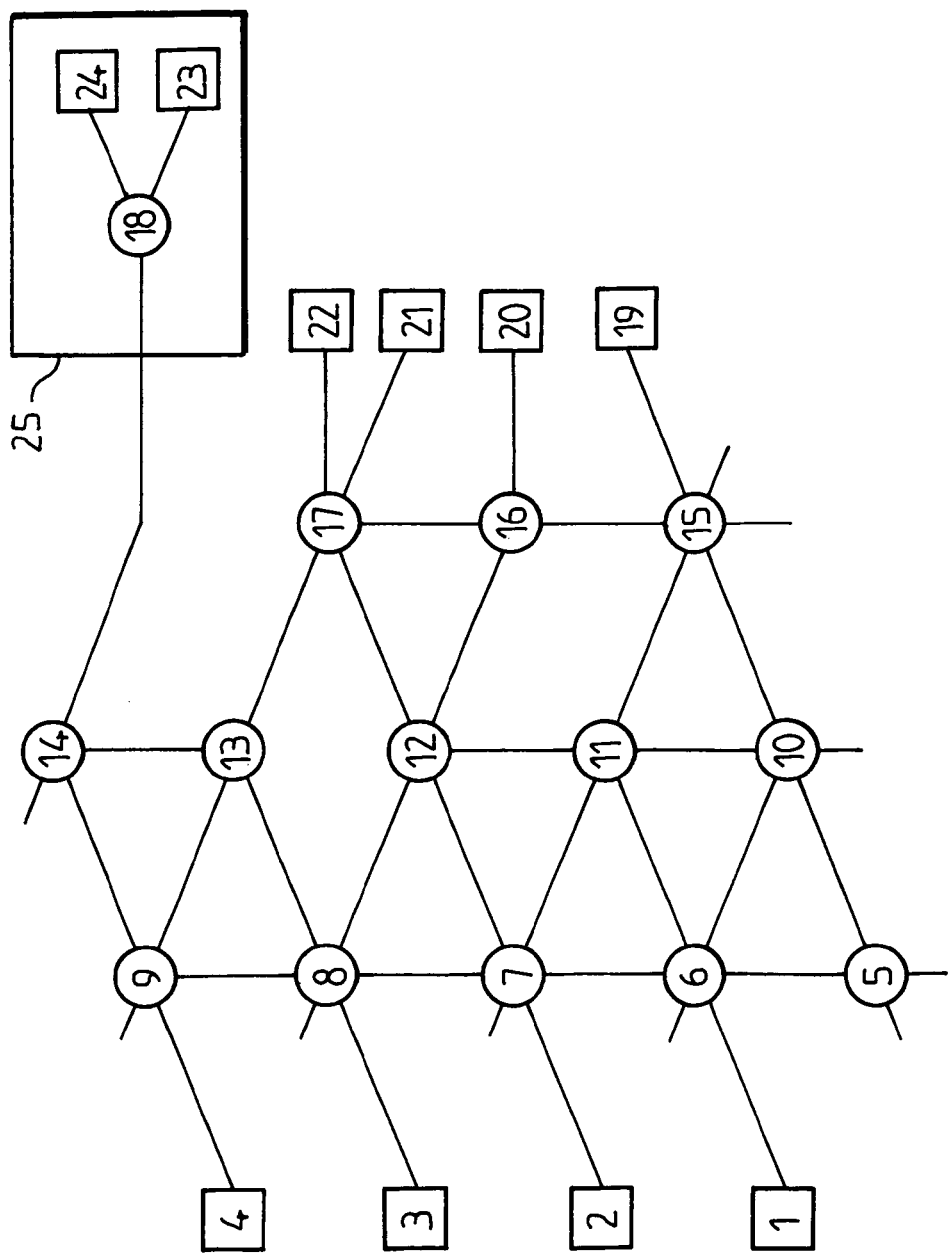
FIG. 1 is a view of a message communication management device of an integrated circuit chip.

As may be seen in FIG. 1, a bidirectional interconnection system includes message initiator agents referenced 1 to 4, intermediate agents referenced 5 to 18 and destination agents 19 to 24. An initiator agent may, for example, be a central processing unit also designated by the acronym CPU, or an external interface allowing communication with other agents or other networks. A destination agent may, for example, be a synchronous dynamic random access memory, termed SDRAM. An intermediate agent may, for example, be a router. An intermediate agent may, furthermore, carry out data compression or decompression, or data encapsulation. The number of each of the agents is, of course, not limited to the example described.

The initiator agents 1 to 4 are linked respectively to the intermediate agents 6 to 9. An intermediate agent can be linked to one or more neighbouring intermediate agents, to one or more initiator agents 1 to 4 and/or to one or more destination agents 19 to 24 by bidirectional links. By way of example, the intermediate agent 6 is linked to the initiator agent 1, to the intermediate agents 5, 7, 10 and 11 and to another element, not represented, only a part of the connection being visible in FIG. 1. The intermediate agent 15 is linked to the intermediate agents 10, 11 and 16, to the destination agent 19 and to two other agents, not represented. Each agent may be locally synchronous.

The interconnection system furthermore includes a restricted access zone 25 in which are disposed the destination agents 23 and 24 and including an intermediate agent 18 making it possible to select the messages having the right to access the destination agents 23 and 24 from the messages that do not benefit from this right. The intermediate agent 18 is disposed at the input of the restricted access zone 25 and is linked to the intermediate agent 14, itself linked to the intermediate agents 9 and 13. The intermediate agent 18 is disposed in the restricted access zone 25 between the intermediate agent 14 and the destination agents 23 and 24.

At least one intermediate agent and advantageously a large number, or even all of them, include a means of error detection, for example a means for detecting that the destination address specified in a message cannot be reached from the said intermediate agent, and a means of error marking, in the form of a determined bit of the message, a value of which indicates the absence of error and the complementary value of which indicates the presence of an error. Thus, provision may be made for any intermediate agent whatsoever of the interconnection network to be able to mark a message as being erroneous, the marking decision being taken as a function of the algorithm of the intermediate agent concerned. In practice, numerous intermediate agents are equipped with algorithms making it possible to verify the consistency of the messages that they receive, in particular the consistency of the message headers. For example, a DRAM type memory controller verifies that the address field does indeed correspond to the valid address field assigned to the memory space. An MMU type controller verifies that the allocation of the zone of data requested by a processing unit is legal. A switching agent verifies that the target agent requested is indeed present in the interconnection network. In the event of an error, it is necessary to inform the initiator agent of the error.

Stated otherwise, an intermediate agent equipped with an error detection means is capable of setting the error signalling bit included in the header of the message to one. For this purpose, the intermediate agents may be equipped with a routing table or with a table of privileges making it possible to determine the destination of the message. If the address specified in the message does not correspond to the routing table, then the intermediate agent performs an error signalling on the error signalling bit of the message. Insofar as the error does not pertain to the address, the message marked as being erroneous is forwarded downstream of the intermediate agent that performed the said error marking to the destination agent, insofar as possible.

By way of example, a message emanating from the initiator agent 2 can be processed by the intermediate agent 7, then processed and marked as being erroneous by the intermediate agent 12, then processed by the intermediate agent 16 that sends it to the destination agent 20. The destination agent 20 detects the error signalling bit contained in the header of the message, formulates an error message and sends it to the initiator agent 2, for example via the intermediate agents 16, 15, 11, 12, then 7. The initiator agent 2 is then aware of the fact that the message has been considered as erroneous and has therefore not been the subject of normal processing, for example a writing, the destination agent 20 being a memory of ROM type.

Moreover, cases occur where the forwarding of the message to its normal destination is not possible. So, the intermediate agent that notes the impossibility of forwarding the message sets the error signalling bit with regard to the error value, unless this has been done previously by another intermediate agent and sends the message marked as erroneous to another receiver agent that can be chosen randomly or, preferably, always the same in a given integrated circuit.

Specifically, in digital circuits it may be found that a destination agent processes relatively few messages and is therefore less loaded than the other destination agents. It is then chosen to send all the messages marked as being erroneous and that cannot be forwarded to their normal destination to the destination agent scheduled to receive the whole of this type of message.

By way of example, provision may be made for the destination agent 21 to receive the whole of the messages marked as erroneous and that cannot be forwarded to their normal destination in the interconnection system represented. A message dispatched by the initiator agent 4, processed by the intermediate agent 9, is then tagged as containing a nonexistent address in the interconnection system and marked as erroneous by the intermediate agent 9, forwarded to the intermediate agent 13 then to the intermediate agent 17 and finally forwarded to the destination agent 21. As seen previously, the destination agent 21 detects the error signalling bit, this disabling any normal processing of the said message, and formulates an error message addressed to the initiator agent 4.

The restricted access zone 25 operates as follows. The intermediate agent 18 performs a verification of the address contained in the messages that it receives originating from the intermediate agent 14, of the privilege from which the said message benefits and of the error signalling bit. If at least one of these three verifications turns out negative, stated otherwise, if the address is erroneous, the privilege is insufficient or the error signalling bit is activated, the intermediate agent 18 marks the said message as being erroneous by setting the error signalling bit, if this has not yet been done, by an intermediate agent situated upstream, then sends the said message marked as being erroneous to the destination agent 23, 24 to which the said message is destined, if the error does not pertain to the address and to the destination agent 21 receiving the whole of the messages with erroneous address in the other case. The intermediate agent 18 provides for the dual function of access control and routing.

Upon receipt of a message marked as being erroneous, the destination agent 23, 24 of the restricted access zone 25 detects the setting of the error signalling bit and formulates an error message then sends the said error message to the initiator agent to warn the said initiator agent of the presence of an error. Thus, a message not having authorization to access the restricted access zone 25 is nevertheless forwarded to the destination agent indicated in the header of the said message if the address is right. However, the normal processing of the message is disabled by the setting of the error signalling bit which disables the normal processing of the said message and gives rise to the formulation followed by the dispatching of an error message addressed to the initiator agent.

The means implemented in the intermediate agents 5 to 18 are essentially software means. The destination agents 19 to 24 may be equipped with two relatively simple modules, a module 26 for reading the error signalling bit contained in the message, and an OR gate 27. The module 26 may be a decoder of the header of the message programmed so as to send on its output linked to the OR gate 27, a signal of identical or inverted level with respect to the error signalling bit.

The module 26 is linked to the input of the destination agent 19 to 24 and one of its outputs is linked to an input of the OR gate 27 forming part of the destination agent. The other input or inputs of the OR gate 27 may be linked to outputs of other message verification modules, for example an address verification module, or else an authorization verification module. The output of the OR gate 27 can be linked to two inputs, one giving rise to the disabling of the normal processing of the message, and the other giving rise to the formulation of an error message. Stated otherwise, the OR gate 27 may be the only hardware element appended to a destination agent.

Figure 3:
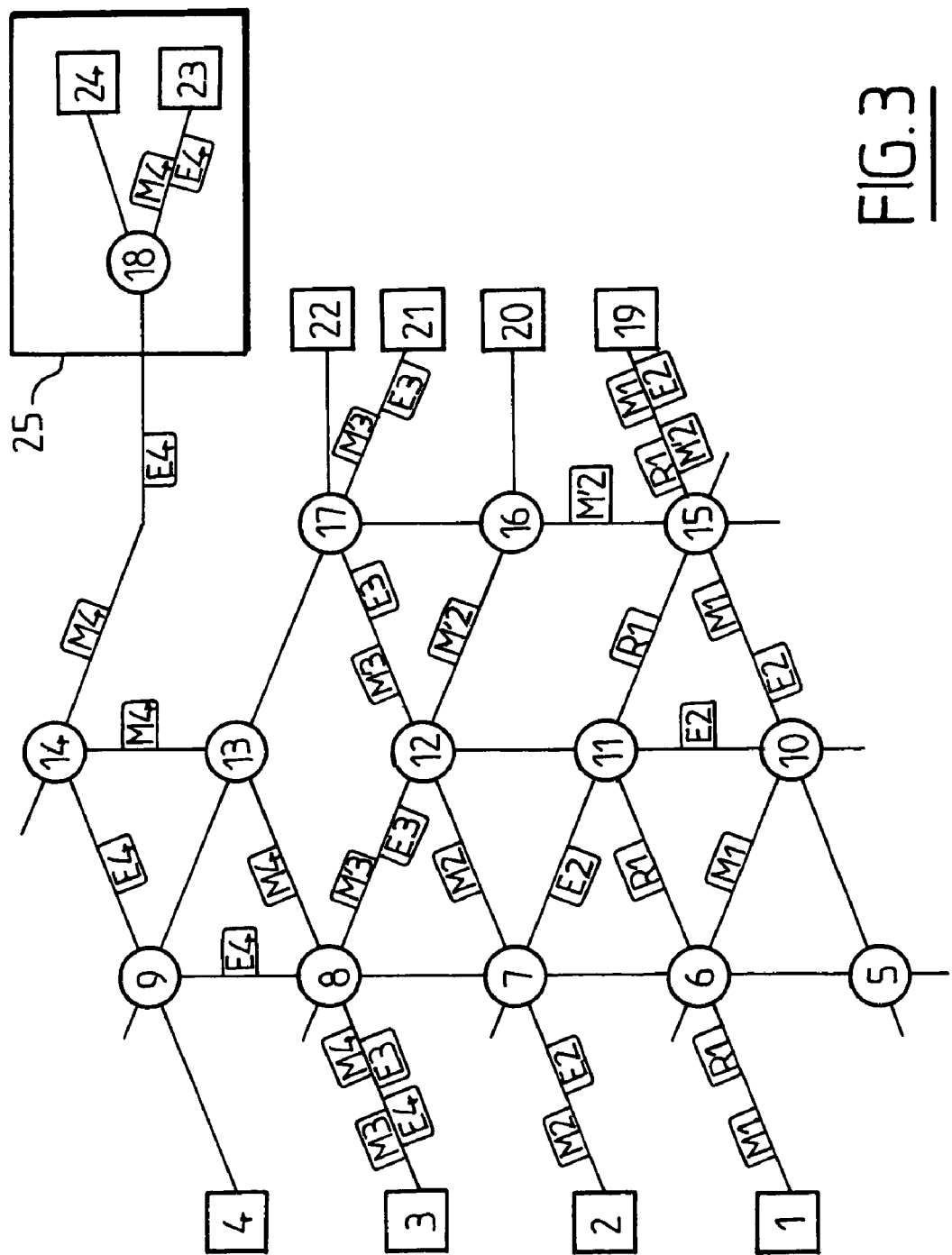
FIG. 3 is a diagram illustrating the operation of the device of FIG. 1.

A few examples of the operation of the interconnection system are illustrated in FIG. 3. A message M1 dispatched by the initiator agent 1 is transmitted by the intermediate agents 6, 10 and 15, then reaches the destination agent 19. The destination agent 19 then formulates a response R1 transmitted to the initiator agent 1 by the intermediate agents 15, 11 and 6.

A message M2 is dispatched by the initiator agent 2 and transmitted by the intermediate agents 7, 12, 16 and 15 and reaches the destination agent 19. However, the intermediate agent 12 detects an error in the message M2 and performs the setting of the error signalling bit contained in the said message M2 designated subsequently M'2. The destination agent 19 therefore receives the message M'2 marked as erroneous, detects the error signalling bit of the said message M'2, disables the normal processing of the message M'2 and formulates an error message E2 which it sends to the initiator agent 2, via the intermediate agents 15, 10, 11 and 7.

The initiator agent 3 dispatches a message M3 including an erroneous address. The interconnection system represented includes six destination agents, thereby requiring an address coded on three bits. However, two unused combinations will remain out of the eight possibilities of addresses coded on three bits. An error may therefore occur in the generation of the address by the initiator agent 3 which leads to the message M3 being attributed an address that does not exist in the interconnection system represented. The message M3 is received by the intermediate agent 8, which detects the error in the destination address contained in the message M3, sets the error signalling bit and sends the message M'3 marked as erroneous to the destination agent 21 receiving the whole of the messages that cannot be forwarded to their normal destination. The message M'3 is routed by the intermediate agents 12 and 17, then reaches the destination agent 21. The destination agent 21 detects the error signalling bit of the message M'3 and formulates an error message E3 destined for the initiator agent 3 and passing via the intermediate agents 17, 12 and then 8.

The initiator agent 3 can also formulate a message M4 destined for the destination agent 23, but devoid of authorization to access the restricted access zone 25. The message M4 therefore includes the address of the destination agent 23, is sent and passes via the intermediate agents 8, 13, 14 and 18. The intermediate agent 18 detects the absence of authorization of the message M4 to access the destination agent 23. The intermediate agent 18 then sets the error signalling bit of the message M4 and forwards the message M'4 marked as erroneous to the destination agent 23. The destination agent 23 receives the message M'4 marked as erroneous, detects the setting of the error signalling bit and therefore does not execute the instructions contained in the message M'4. The destination agent 23 formulates an error message E4 destined for the initiator agent 3. The error message E4 is forwarded by the intermediate agents 18, 14, 9 and 8 to the initiator agent 3.

By way of variant, provision may be made for the header of the messages to include an error signalling zone extending over several bits, for example over a byte, in such a way that an item of information relating to the nature of the error can be coded in the error signalling zone. The destination agent can insert the error signalling zone into the error message addressed to the initiator agent. The initiator agent benefits from better awareness of the errors that occur.

It is therefore understood that a system and/or method allow judicious error processing with error signalling addressed to the initiator of the erroneous message, using the properties of a point-to-point interconnection system on an integrated circuit, by implementing hardware means that are extremely reduced and software means that do not significantly affect the performance of the interconnection network. Quite the contrary, the operation of the interconnection system is improved by the generalized processing of erroneous messages while dispensing with the presence of a specialized element for processing errors which requires additional links which will be dedicated to it. One thus avoids the need for the intermediate agents to have to generate an error message, which would require intermediate agents of complicated structure. The intermediate agents execute their conventional mission of transmitting a message and merely modify a bit in the event of an error, this remaining simple to do and inexpensive. The links can remain unchanged as compared with an interconnection network not implementing the method.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of communication between agents in an interconnection system comprising at least three elements, the method comprising:

sending a message destined for a determined receiver agent by a message initiator agent over a point-to-point interconnection network;

detecting an error and, if an error is actually detected, the said message is marked as being erroneous, wherein the error detection is performed by an intermediate agent of the point-to-point interconnection network; and forwarding the message to the said determined receiver agent if the said forwarding is possible and, if the said message is marked as being erroneous, the receiver agent formulates an error message and sends it to the initiator agent so as to warn the said initiator agent of the presence of an error, wherein if the message cannot be forwarded to the said determined receiver agent from the said initiator agent, then the message is marked as being erroneous and forwarded to another receiver agent linked to the said interconnection network.

2. The method according to claim 1, wherein the said message is marked as being erroneous by the setting of at least one bit of the said message.

3. The method according to claim 1, wherein the receiver agent detects the marking of the message before responding to the initiator agent.

4. The method according to claim 3, wherein the detection of the said marking of the message disables the normal processing of the message by the receiver agent.

5. The method according to claim 1, wherein the other receiver agent is a determined receiver agent.

6. The method according to claim 1, wherein the said other receiver agent receives all the messages that cannot be forwarded from the said initiator agent.

7. The method according to claim 1, wherein if the said determined receiver agent belongs to a zone of restricted access wherein the said message does not have authorization to enter, then the said message is marked as being erroneous and then sent to the said determined receiver agent notwithstanding the access restriction.

8. A system for communication between agents in a point-to-point interconnection system, comprising at least three elements, the system comprising:
at least one initiator agent capable of dispatching at least one message destined for at least one determined receiver agent, at least one intermediate agent capable of forwarding at least one message to at least one determined receiver agent, at least one receiver agent capable of receiving at least one message originating from said at least one initiator agent via said at least one intermediate agent, means of error detection and means of erroneous message marking, the receiver agent comprising means for formulating an error message and means for sending the error message to the initiator agent so as to warn the said initiator agent of the presence of an error, wherein at least one intermediate agent includes means of error detection and means of erroneous message marking, wherein at least one intermediate agent includes means for forwarding an erroneous marked message to another receiver agent linked to the interconnection network, the said forwarding means being active if the message may not be forwarded to the said determined receiver agent from the said initiator agent.

9. The system according to claim 8, wherein the means of erroneous message marking include a means of setting at least one determined bit of the said message.

10. The system according to claim 9, wherein the receiver agent includes means for disabling the elaboration of a response to an erroneous message.

11. The system according to claim 8, wherein the receiver agent includes means for disabling the elaboration of a response to an erroneous message.

* * * * *

UNITED STATES PATENT AND TRADEMARK OFFICE
CERTIFICATE OF CORRECTION

| | | |
|---|---|---|
| PATENT NO. | : 7,574,629 B2 | Page 1 of 1 |
| APPLICATION NO. | : 11/054179 | |
| DATED | : August 11, 2009 | |
| INVENTOR(S) | : Douady et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 620 days Delete the phrase "by 620 days" and insert -- by 1122 days --

Signed and Sealed this

Twentieth Day of April, 2010

David J. Kappos
*Director of the United States Patent and Trademark Office*